US010250797B2

(12) United States Patent
Shabtay et al.

(10) Patent No.: US 10,250,797 B2
(45) Date of Patent: Apr. 2, 2019

(54) THIN MULTI-APERTURE IMAGING SYSTEM WITH AUTO-FOCUS AND METHODS FOR USING SAME

(71) Applicant: Corephotonics Ltd., Tel-Aviv (IL)

(72) Inventors: Gal Shabtay, Tel-Aviv (IL); Noy Cohen, Tel-Aviv (IL); Nadav Geva, Tel-Aviv (IL); Oded Gigushinski, Herzlia (IL); Ephraim Goldenberg, Ashdod (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 15/982,401

(22) Filed: May 17, 2018

(65) Prior Publication Data

US 2018/0278831 A1  Sep. 27, 2018

Related U.S. Application Data

(63) Continuation of application No. 15/407,271, filed on Jan. 17, 2017, now Pat. No. 9,998,653, which is a
(Continued)

(51) Int. Cl.
*G02B 7/36* (2006.01)
*H04N 5/33* (2006.01)
(Continued)

(52) U.S. Cl.
CPC .......... *H04N 5/23212* (2013.01); *G02B 7/36* (2013.01); *G02B 27/646* (2013.01);
(Continued)

(58) Field of Classification Search
CPC .... H04N 5/23212; H04N 5/2258; H04N 9/09; H04N 5/23232; H04N 5/2628; H04N 9/64; G02B 7/36; G02B 27/646
See application file for complete search history.

(56) References Cited

U.S. PATENT DOCUMENTS

| 4,199,785 A | 4/1980 | McCullough et al. |
| 5,005,083 A | 4/1991 | Grage et al. |

(Continued)

FOREIGN PATENT DOCUMENTS

| CN | 101276415 A | 10/2008 |
| CN | 102739949 A | 10/2012 |

(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Amy R Hsu
(74) *Attorney, Agent, or Firm* — Nathan and Associates; Menachem Nathan

(57) ABSTRACT

Dual-aperture digital cameras with auto-focus (AF) and related methods for obtaining a focused and, optionally optically stabilized color image of an object or scene. A dual-aperture camera includes a first sub-camera having a first optics bloc and a color image sensor for providing a color image, a second sub-camera having a second optics bloc and a clear image sensor for providing a luminance image, the first and second sub-cameras having substantially the same field of view, an AF mechanism coupled mechanically at least to the first optics bloc, and a camera controller coupled to the AF mechanism and to the two image sensors and configured to control the AF mechanism, to calculate a scaling difference and a sharpness difference between the color and luminance images, the scaling and sharpness differences being due to the AF mechanism, and to process the color and luminance images into a fused color image using the calculated differences.

7 Claims, 10 Drawing Sheets

FIG. 2

Related U.S. Application Data continuation of application No. 14/906,116, filed as application No. PCT/IB2014/063393 on Jul. 24, 2014, now Pat. No. 9,571,731.

(60) Provisional application No. 61/861,185, filed on Aug. 1, 2013.

(51) Int. Cl.
| | |
|---|---|
| *H04N 9/04* | (2006.01) |
| *H04N 9/09* | (2006.01) |
| *H04N 9/64* | (2006.01) |
| *G02B 27/64* | (2006.01) |
| *H04N 5/225* | (2006.01) |
| *H04N 5/232* | (2006.01) |
| *H04N 5/262* | (2006.01) |

(52) U.S. Cl.
CPC ....... *H04N 5/2258* (2013.01); *H04N 5/23232* (2013.01); *H04N 5/2628* (2013.01); *H04N 5/33* (2013.01); *H04N 9/045* (2013.01); *H04N 9/09* (2013.01); *H04N 9/64* (2013.01)

(56) References Cited

U.S. PATENT DOCUMENTS

| | | |
|---|---|---|
| 5,032,917 A | 7/1991 | Aschwanden |
| 5,051,830 A | 9/1991 | von Hoessle |
| 5,248,971 A | 9/1993 | Mandl |
| 5,287,093 A | 2/1994 | Amano et al. |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,860,456 B1 * | 1/2018 | Musatenko .......... H04N 5/2621 |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0063711 A1 | 5/2002 | Park et al. |
| 2002/0075258 A1 | 6/2002 | Park et al. |
| 2002/0122113 A1 | 9/2002 | Foote |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0017386 A1 | 1/2004 | Liu et al. |
| 2004/0027367 A1 | 2/2004 | Pilu |
| 2004/0061788 A1 | 4/2004 | Bateman |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2007/0024737 A1 | 2/2007 | Nakamura et al. |

(56) References Cited

U.S. PATENT DOCUMENTS

| | | |
|---|---|---|
| 2007/0052810 A1* | 3/2007 | Monroe ............... G02B 13/16 348/211.11 |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0025712 A1* | 1/2008 | Furuya ................. G03B 17/18 396/88 |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0117316 A1 | 5/2008 | Orimoto |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0103194 A1 | 4/2010 | Chen et al. |
| 2010/0238327 A1 | 9/2010 | Griffith et al. |
| 2010/0283842 A1 | 11/2010 | Guissin et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1* | 7/2011 | Shintani ................ G03B 9/36 348/362 |
| 2011/0229054 A1 | 9/2011 | Weston et al. |
| 2011/0234853 A1 | 9/2011 | Hayashi et al. |
| 2011/0234881 A1 | 9/2011 | Nakabayashi et al. |
| 2011/0242286 A1 | 10/2011 | Pace et al. |
| 2011/0242355 A1 | 10/2011 | Goma et al. |
| 2012/0026366 A1* | 2/2012 | Golan .................. H04N 5/232 348/240.2 |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0307111 A1* | 12/2012 | Miyakoshi .......... H04N 5/2258 348/239 |
| 2012/0320467 A1 | 12/2012 | Baik et al. |
| 2013/0002928 A1 | 1/2013 | Imai |
| 2013/0093842 A1 | 4/2013 | Yahata |
| 2013/0135445 A1 | 5/2013 | Dahl et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0321668 A1 | 12/2013 | Kamath |
| 2014/0049615 A1* | 2/2014 | Uwagawa ............ H04N 5/2252 348/47 |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0092066 A1 | 4/2015 | Geiss et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0271471 A1 | 9/2015 | Hsieh et al. |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0301840 A1 | 10/2016 | Du et al. |
| 2016/0353012 A1 | 12/2016 | Kao et al. |
| 2017/0019616 A1 | 1/2017 | Zhu et al. |
| 2017/0214846 A1 | 7/2017 | Du et al. |
| 2017/0214866 A1 | 7/2017 | Zhu et al. |
| 2017/0289458 A1 | 10/2017 | Song et al. |
| 2018/0120674 A1 | 5/2018 | Avivi et al. |
| 2018/0150973 A1 | 5/2018 | Tang et al. |
| 2018/0241922 A1 | 8/2018 | Baldwin et al. |
| 2018/0295292 A1 | 10/2018 | Lee et al. |

FOREIGN PATENT DOCUMENTS

| | | |
|---|---|---|
| CN | 103024272 A | 4/2013 |
| EP | 1536633 A1 | 6/2005 |
| EP | 2523450 A1 | 11/2012 |
| JP | 04211230 A | 8/1992 |
| JP | 107318864 A | 12/1995 |
| JP | 08271976 A | 10/1996 |
| JP | 2003298920 A | 10/2003 |
| JP | 2004133054 I A | 4/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2013106289 A | 5/2013 |
| KR | 20100008936 A | 1/2010 |
| KR | 20140014787 A | 2/2014 |
| KR | 101477178 B1 | 12/2014 |

OTHER PUBLICATIONS

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera an-ay, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 9 pages.

Superimposed multi-resolution imaging, Caries et al., Publisher: Optical Society of America, 2017, 13 pages.

(56) References Cited

OTHER PUBLICATIONS

Viewfinder Alignment, Adams et al., Publisher: Eurographics, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.

* cited by examiner

THIN MULTI-APERTURE IMAGING SYSTEM WITH AUTO-FOCUS AND METHODS FOR USING SAME

CROSS REFERENCE TO RELATED APPLICATIONS

This application is a Continuation application of U.S. patent application Ser. No. 15/407,271 (now allowed), which was a Continuation application of U.S. patent application Ser. No. 14/906,116 (issued as U.S. Pat. No. 9,571,731), which was a 371 application from international application PCT/IB2014/063393 and is related to and claims priority from U.S. Provisional Patent Application No. 61/861,185 filed Aug. 1, 2013 and having the same title, which is incorporated herein by reference in its entirety.

FIELD

Embodiments disclosed herein relate in general to digital cameras and in particular to thin multi-aperture digital cameras with auto-focus.

BACKGROUND

In recent years, mobile devices such as cell-phones, tablets and laptops have become ubiquitous. Most of these devices include one or two compact cameras—a main rear-facing camera (i.e. a camera on the back side of the device, facing away from the user and often used for casual photography) and a secondary front-facing camera (i.e. a camera located on the front side of the device and often used for video conferencing).

Although relatively compact in nature, the design of most of these cameras is very similar to the traditional structure of a digital still camera, i.e. they comprise an optical component (or a train of several optical elements and a main aperture) placed on top of an image sensor. The optical component (also referred to as "optics") refracts the incoming light rays and bends them to create an image of a scene on the sensor. The dimensions of these cameras are largely determined by the size of the sensor and by the height of the optics. These are usually tied together through the focal length ("f") of the lens and its field of view (FOV)—a lens that has to image a certain FOV on a sensor of a certain size has a specific focal length. Keeping the FOV constant, the larger the sensor dimensions (e.g. in an X-Y plane), the larger the focal length and the optics height.

As the dimensions of mobile devices shrink, the compact camera dimensions become more and more a key factor that limits the device thickness. Several approaches have been proposed to reduce the compact camera thickness in order to alleviate this constraint. Recently, multi-aperture systems have been proposed for this purpose. In such systems, instead of having one aperture with one train of optical elements, the camera is divided into several apertures, each with dedicated optical elements, all apertures sharing a similar field of view. Hereinafter, each such aperture, together with the optics and the sensor area on which the image is formed, is defined as a "sub-camera". Typically, in multi-aperture camera designs, each sub-camera creates a smaller image on the image sensor compared with the image created by a reference single-aperture camera. Therefore, the height of each sub-camera can be smaller than the height of a single-aperture camera, reducing the total height of the camera could be reduced and allowing for slimmer designs of mobile devices.

FIG. 1A and FIG. 1B show a schematic design of a traditional camera and of a dual-aperture camera with two sub-cameras, respectively. A traditional camera 100' in FIG. 1A includes an image sensor 102 placed on a substrate 104 and a lens 106. A "camera height" is defined as the height of the camera module, from substrate 104 to the top of lens 106. A dual-aperture camera 100" in FIG. 1B includes two sub-cameras, a sub-camera 1 with an image sensor 112a and a lens 116a with an optical axis 118a, and a sub-camera 2 with, an image sensor 112b and a lens 116b with an optical axis 118b. The two sensors are placed on, respectively, substrates 114a and 114b. For comparison's sake, it is assumed that the reference single-aperture camera and the dual-aperture camera have the same field of view (FOV) and the sensors have the same pixel size. However, image sensor 102 has a higher resolution (number of pixels) compared with image sensor 112a or image sensor 112b, and is therefore larger in size. The potential advantage in camera height of the dual-aperture camera (i.e. the thickness from substrate 114a to the top of lens 116a and from substrate 114b to the top of lens 116b) may be appreciated.

There are several significant challenges involved in multi-aperture camera designs. First and foremost, the sensor area of each sub-camera is smaller compared with that of a single-aperture camera. If the pixel size in each sub-camera sensor is kept the same as that in the single-aperture camera sensor, the resolution of an image captured by each sub-camera is smaller than that captured by the single-aperture camera. If the resolution of the output image is to be kept the same, the images from the different sub-cameras need to be combined into a higher-resolution image. This is usually done in the digital domain, by a dedicated algorithm. Several methods have been proposed for combining lower-resolution images to produce a higher-resolution image. Some algorithms in such methods require a registration step between the set of low-resolution images, to account for parallax (which is present in a multi-aperture camera system due to the shift in point-of-view between sub-cameras). One such algorithm is described in co-assigned PCT patent application PCT/IB2014/062180 titled "Dual aperture zoom digital camera", which is incorporated herein by reference in its entirety.

Another challenge relates to the requirement that the camera provides an in-focus image for a wide range of object distances (usually from several centimeters to infinity in compact camera modules). To fulfill this requirement, a single-aperture camera may include an Auto-Focus (AF) mechanism that controls the focus position of the optics, by moving the optical element along the optical axis, thus changing its height above the sensor. In multi-aperture cameras, in order to support an in-focus image for a wide range of object distances, a straightforward approach would be to provide a dedicated AF mechanism in each sub-camera. This approach has several drawbacks including increased size and cost of the camera, higher operating power and more complicated control, as the AF mechanisms of each sub-camera needs to be synchronized, to ensure all of the sub-cameras are focused to the same position.

Another complication that may arise when using an AF mechanism in a multi-aperture camera is connected with the algorithm that combines the lower resolution sub-camera images to produce a higher resolution image. Since an AF mechanism moves the optical element along the optical axis above the sensor, it scales the image that is formed on the sensor to some extent. Slight differences between the focusing positions of different AF mechanisms in each sub-camera may result in different scales applied to the lower resolution sub-camera images. Such differences in scale may degrade the performance of the image registration step in the algorithm. Correcting for the different scale is not trivial, due to the dynamic nature of the scale—the scale applied on the image depends on the focus position of the optics, which in turn changes with object distance. This means that the scale cannot be trivially corrected by calibrating the multi-aperture camera and applying a fixed correction, but rather, the correct scale has to be estimated at each image. Estimating the correct scale to apply from the image is not trivial, in the presence of parallax (where different objects appear at different locations as a function from their distance from the camera) and in the presence of possible occlusions of objects in one aperture but not in the other. There is therefore a need for a method that can accurately estimate and correct differences in scaling on a per-image basis.

As an alternative to using AF, multi-aperture camera designs have been proposed with no AF mechanism at all. Such designs rely on the smaller focal length of each sub-camera to provide increased depth-of-focus (DOF) compared with a corresponding single-aperture camera that supports a larger sensor. Since a larger DOF means that a wider range of object distances is imaged in-focus onto the sensor, the AF mechanism could be removed. While this approach is advantageous in terms of cost, size and system complexity, the larger DOF that results from the shorter focal length of a multi-aperture camera is often insufficient to support an in-focus image for object distances ranging from a few centimeters to infinity. In these cases, settling for a multi-aperture camera with fixed-focus optics results in poor imaging performance at close object distances.

Between using multiple AF mechanisms and using only fixed-focus optics, there is a need for a multi-aperture camera system that combines the benefits of an AF mechanism without adding additional complexity and cost to the camera system.

SUMMARY

Embodiments disclosed herein provide designs of a multi-aperture camera with an AF mechanism, describe an algorithm that dynamically corrects for scale differences between sub-camera images, and propose a color filter array (CFA) design that may result in higher resolution and sensitivity when combining sub-camera images, compared with standard CFAs.

In various embodiments, there are provided dual-aperture digital cameras with auto-focus (AF) for imaging an object or scene, each such dual-aperture digital camera comprising a first sub-camera that includes a first optics bloc and a color image sensor with a first number of pixels, the first camera operative to provide a color image of the object or scene, a second sub-camera that includes a second optics bloc and a clear image sensor having a second number of pixels, the second sub-camera operative to provide a luminance image of the object or scene, the first and second sub-cameras having substantially the same field of view, an AF mechanism coupled mechanically at least to the first optics bloc, and a camera controller coupled to the AF mechanism and to the two image sensors and configured to control the AF mechanism, to calculate a scaling difference and a sharpness difference between the color and luminance images, the scaling and sharpness differences being due to the AF mechanism, and to process the color and luminance images into a fused color image using the calculated differences.

The first number of pixels and second number of pixels may be equal or different. The first and second images sensors are formed on a single substrate. The first sub-camera may include an infra-red (IR) filter that blocks IR wavelengths from entering the color image sensor and the second sub-camera may be configured to allow at least some IR wavelengths to enter the clear image sensor. In some embodiments, the color image sensor may include a non-Bayer color filter array (CFA).

In an embodiment, the AF mechanism may be coupled mechanically to the first optics bloc, and the second optics bloc may have a fixed focus position. In an embodiment, the fixed focus position may be such that a DOF range of the second sub-camera is between infinity and less than about 100 cm. In an embodiment, the AF mechanism may be coupled mechanically to the first and second optics blocs and operative to move them together in a direction common to respective optics bloc optical axes.

In an embodiment, the camera may further comprise an optical image stabilization mechanism coupled mechanically to the first and second optics blocs and in a direction perpendicular to respective optics bloc optical axes to optically stabilize the AF fused color image.

In an embodiment there is provided method for obtaining a focused color image of an object or scene using a dual-aperture camera, comprising the steps of obtaining simultaneously an auto-focused color image and an auto-focused or fixed focus luminance image of the object or scene, wherein the color image has a first resolution, a first effective resolution and a first signal-to-noise ratio (SNR), and wherein the luminance image has a second resolution, a second effective resolution and a second SNR, preprocessing the two images to obtain respective rectified, normalized and scale-adjusted color and luminance images considering scaling and sharpness differences caused by the AF action, performing local registration between the rectified, normalized and scale-adjusted color and luminance images to obtain registered images, and fusing the registered images into a focused fused color image.

In an embodiment, the step of preprocessing to obtain scale-adjusted color and luminance images includes calculating a set of corresponding points in the color and luminance images, extracting a single coordinate from each corresponding point and using the single coordinate to estimate a scaling factor S between the color and luminance images. The extracted coordinate is Y and the scaling factor S may be given by $S=(Y2'^*W^*Y2)\backslash Y2'^*W^*Y1$, where Y1 is a vector of Y coordinates of points taken from one image, Y2 is a vector of Y coordinates of points taken from the other image, and W is a diagonal matrix that holds the absolute values of Y2.

In an embodiment, a method may further comprise using scaling factor S to scale one of the images to match the other image, thereby obtaining the registered images.

In an embodiment, a method may further comprise optically stabilizing the obtained color and luminance images.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way.

DETAILED DESCRIPTION

Figure 1A:
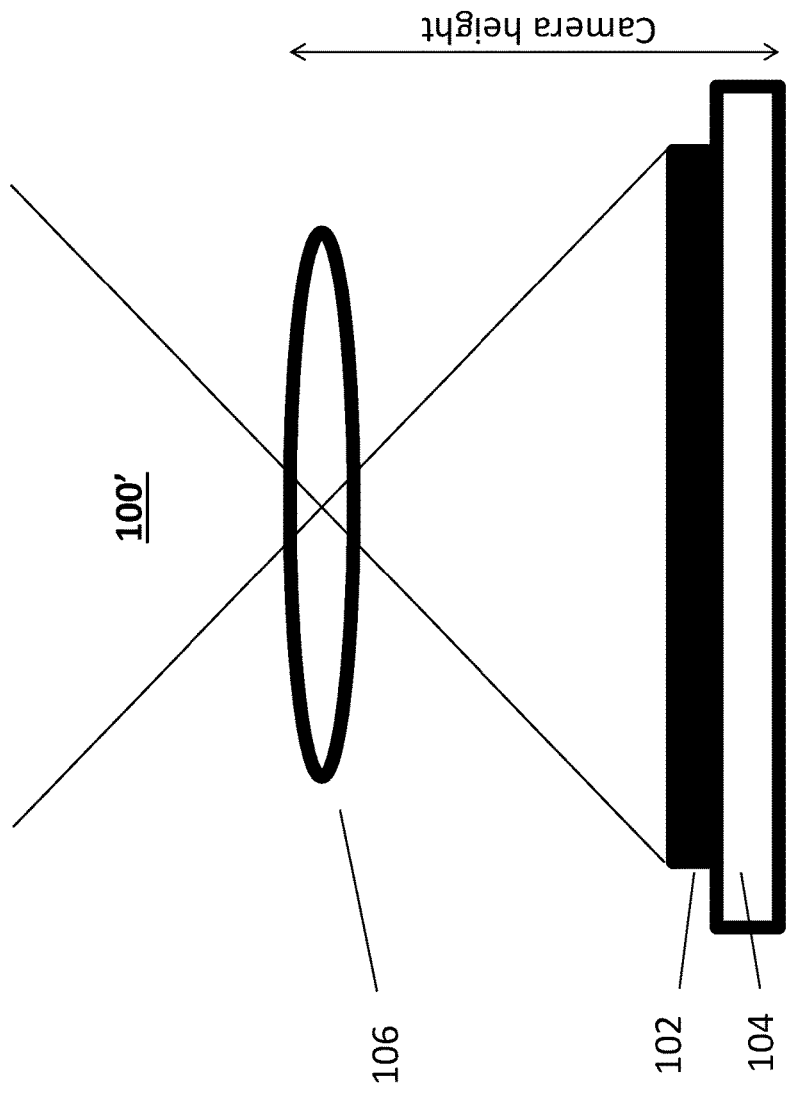
FIG. 1A shows schematically the design of a traditional digital camera.
Figure 1B:
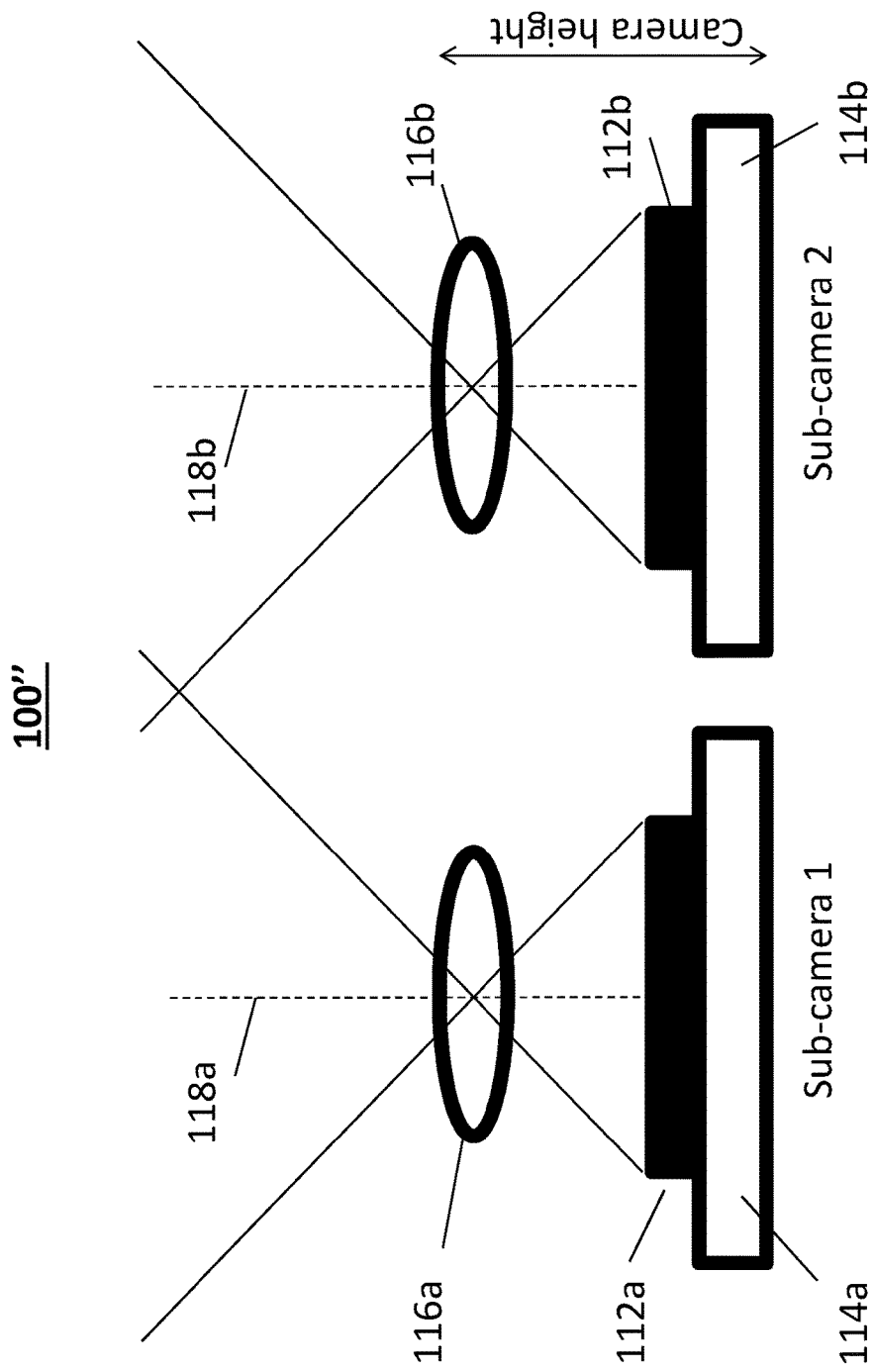
FIG. 1B shows schematically the design of a dual-aperture camera.
Figure 2:
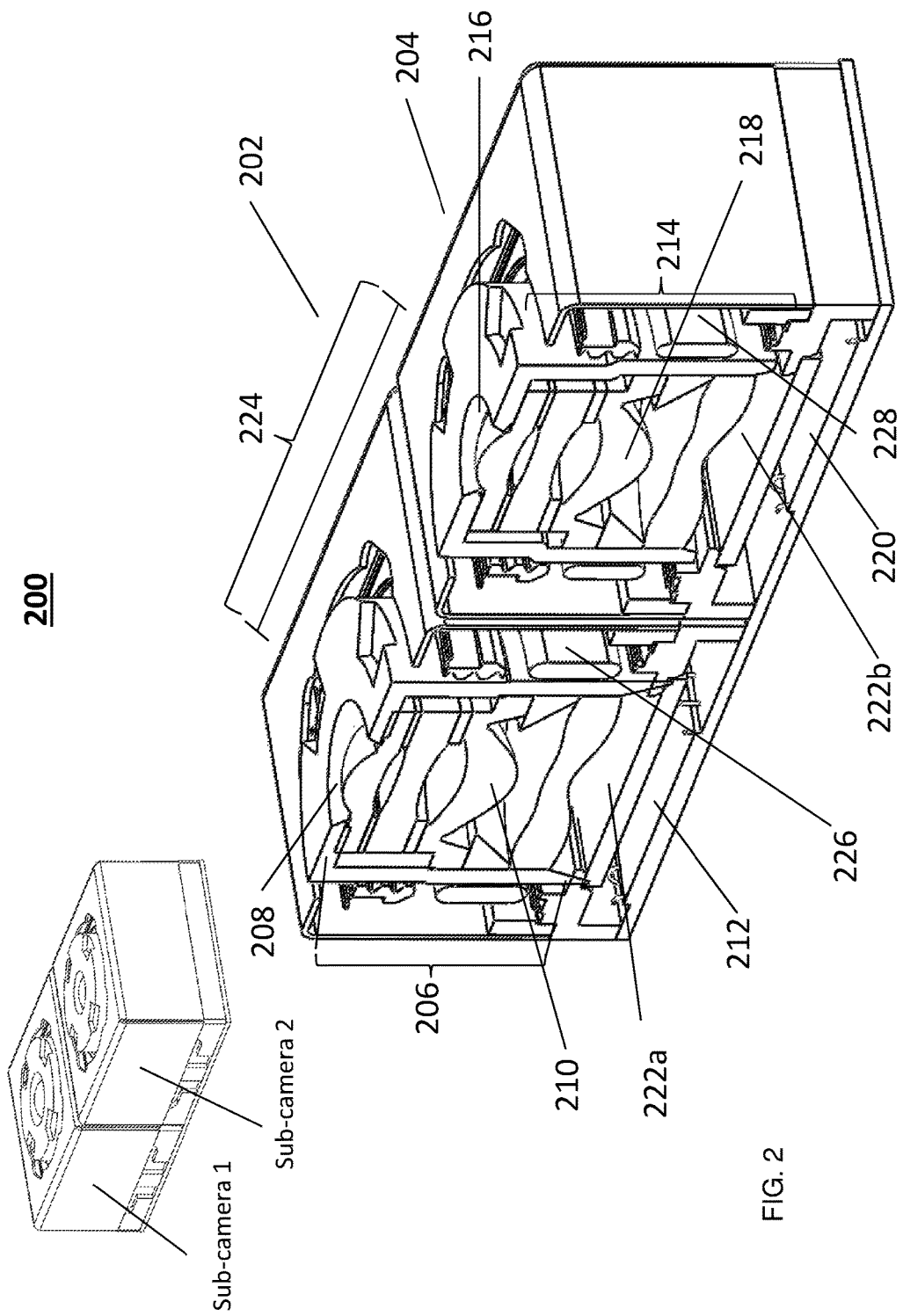
FIG. 2 shows schematically an embodiment of a dual-aperture imaging system with auto-focus disclosed herein, in (a) a general isometric view, and (b) a sectioned isometric view.

FIG. 2 shows schematically an embodiment of a dual-aperture imaging system with auto-focus disclosed herein and numbered 200, in (a) a general isometric view, and (b) a sectioned isometric view. In the following description, "imaging system" and "camera" may be used interchangeably. System 200 comprises two sub-cameras, labeled 202 and 204, each sub-camera having its own optics. Thus, sub-camera 202 includes an optics bloc 206 with an aperture 208 and an optical lens module 210, as well as a sensor 212. Similarly, sub-camera 204 includes an optics bloc 214 with an aperture 216 and an optical lens module 218, as well as a sensor 220. The sensors are also referred to henceforth as "sensor 1" (212) and "sensor 2" (220). Note that the two sensors may be implemented as two distinct areas on the same substrate, and not necessarily as two stand-alone sensors. Each optical lens module may include several lens elements as well as an Infra-Red (IR) filter 222a, b. In some embodiments, some or all of the lens elements belonging to different apertures may be formed on the same substrate. The two sub-cameras are positioned next to each other, with a small baseline 224 between the two apertures 208 and 216. Each sub-camera further includes an auto-focus mechanism, respectively 226 and 228.

Figure 3:
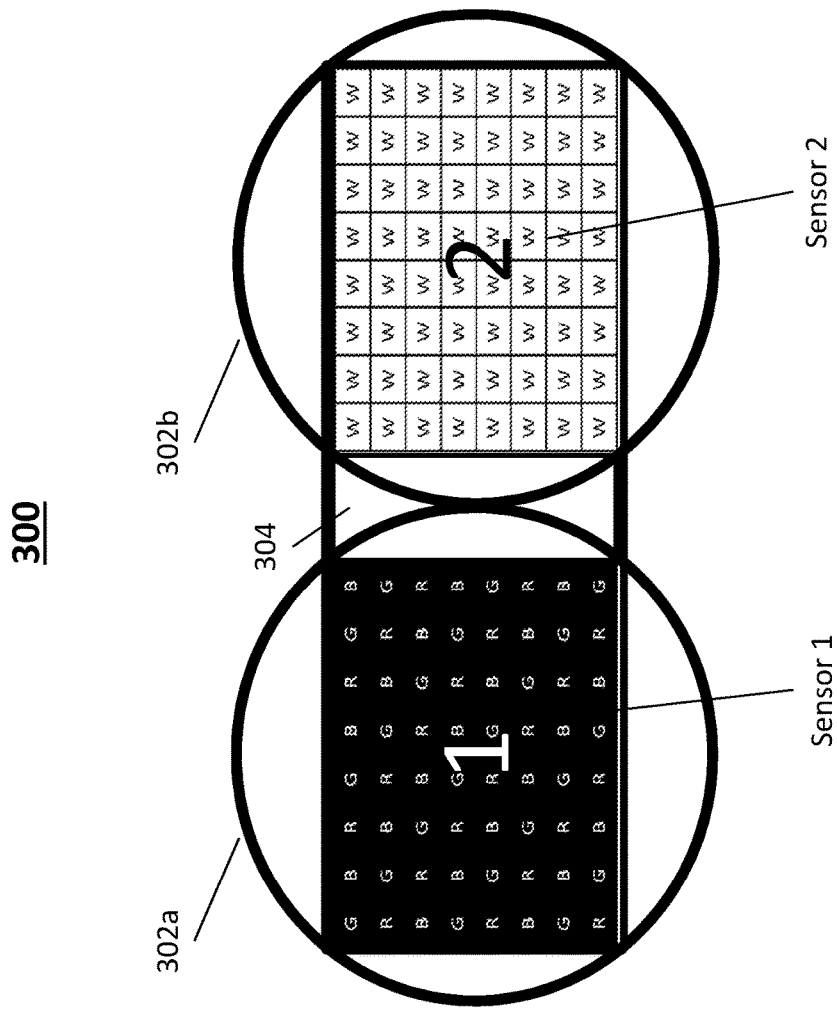
FIG. 3 shows an embodiment of an image sensor for the imaging system in FIG. 2, in which one sub-camera has a CFA sensor, while another sub-camera has a clear sensor.

The sensors used in each sub-camera may have different color filter arrays (CFAs). In some embodiments, sensor 1 may have one type of CFA, while sensor 2 may have another type of CFA. In some embodiments, sensor 1 may have a CFA and sensor 2 may have a "white" or "clear" filter array (marked by "W")—in which all the pixels absorb the same wide range of wavelengths, e.g. between 400 nm and 700 nm (instead of each pixel absorbing a smaller portion of the spectrum). A sensor having a color filter array may be referred to henceforth as a "color image sensor", while a sensor with a clear or W filter array is referred to as a "clear image sensor". FIG. 3A shows a sensor embodiment 300, where numeral "1" represents sensor 1 (with a CFA) and numeral "2" represents sensor 2 (with a clear "white" filter array). Circles 302a, 302b mark image circles formed by the optics on the sensors, while a white area 304 marks the substrate on which the sensors are located. Circles 302a, 302b may be larger than the respective size of the sensor the image is formed on. In some cases, overlap between the two image circles may occur and mechanical light blocking elements (e.g., walls) may be needed to prevent optical cross-talk between the sub-cameras.

The CFA of sensor 1 may be standard or non-standard. As used herein, a "standard CFA" may include a known CFA such as Bayer, RGBE, CYYM, CYGM and different RGBW filters such as RGBW#1, RGBW#2 and RGBW#3. For example, non-Bayer CFA patterns include repetitions of a 2×2 micro-cell in which the color filter order is RRBB, RBBR or YCCY where Y=Yellow=Green+Red, C=Cyan=Green+Blue; repetition of a 3×3 micro-cell in which the color filter order is GBRRGBBRG (e.g. as in sensor 1 in FIG. 3A); and repetitions of a 6×6 micro-cell in which the color filter order is one of the following options:

1. Line 1: RBBRRB. Line 2: RWRBWB. Line 3: BBRBRR. Line 4: RRBRBB. Line 5: BWBRWR. Line 6: BRRBBR.
2. Line 1: BBGRRG. Line 2: RGRBGB. Line 3: GBRGRB. Line 4: RRGBBG. Line 5: BGBRGR. Line 6: GRBGBR.
3. Line 1: RBBRRB. Line 2: RGRBGB. Line 3: BBRBRR. Line 4: RRBRBB. Line 5: BGBRGR. Line 6: BRRBBR.
4. Line 1: RBRBRB. Line 2: BGBRGR. Line 3: RBRBRB. Line 4: BRBRBR. Line 5: RGRBGB. Line 6: BRBRBR.

The color CFA of sensor 1 in FIG. 3B is a Bayer pattern. By using a CFA on sensor 1, sub-camera 1 captures the color information about the scene, while sub-camera 2 captures luminance information about the scene.

The CFA pattern of sensor 1 in FIG. 3A as well as other non-Bayer CFAs listed above an advantage over the standard Bayer pattern in that they divide the red, green and blue colors evenly across the sensor pixels. This results in a finer sampling of red and blue colors, while the green color experiences coarser sampling compared with the standard Bayer pattern. However, as the image that is captured by sensor 2 is used to extract luminance information about the scene (instead of relying on the green channel for that, as is the case when using a Bayer CFA), the green pixels are only used for color information. In traditional compact camera design, a filter that lets in light in the visible range and blocks light in the IR range is typically placed in the optical path, sometimes as part of a cover glass that protects the sensor. Although the blocking of IR light wastes photons, it allows for a more accurate estimation of the color in the scene, as it reduces color crosstalk from the spectral response of the R, G and B color filters (which may be sensitive to IR light). In an embodiment, clear sensor 2 is made sensitive to IR light by removing the IR filter or by redesigning its spectral response to let in some light in the IR range. The motivation for capturing IR light, in addition to light in the visible range, is to increase the Signal-to-Noise Ratio (SNR) in the image, as many natural and artificial light sources also emit photons in the IR spectrum. Unlike a sensor with a color CFA (i.e. sensor 1), absorption of IR light does not introduce color cross-talk in clear sensor 2 (since the sensor records a panchromatic image of the scene).

Removing the IR filter may have some negative implications on image quality. For example, extending the range of wavelengths that are captured by the camera may lead to longitudinal chromatic aberrations that may degrade the Point Spread Function (PSF), resulting in a blurrier image. To address this issue, in an embodiment, the optics of sub-camera 2 are optimized across both the visible and the IR range, to mitigate the effect of chromatic aberrations and to result in a more compact PSF compared with standard compact camera optics that use an IR filter. This is unlike the standard optimization process, which considers only wavelengths inside the visible range.

In use, the two sub-cameras share a similar FOV and have substantially equal (limited only by manufacturing tolerances) focal lengths. An image capture process is synchronized, so that the two sub-cameras capture an image of the scene at a particular moment. Due to the small baseline between the two apertures (which could be only a few millimeters, for example 6.5 mm or 8.5 mm) of the sub-cameras, the output images may show parallax, depending on the object distances in the scene. A digital image processing algorithm combines the two images into one image, in a process called "image fusion". Henceforth, the algorithm performing this process is called "image fusion algorithm". The resulting image may have a higher resolution (in terms of image pixels) and/or a higher "effective resolution" (in terms of the ability to resolve spatial frequencies in the scene, higher "effective resolution" meaning the ability to resolve higher spatial frequencies) and/or a higher SNR than that of one sub-camera image.

In terms of resolution and exemplarily, if each sub-camera produces a 5 megapixel (2592×1944 pixels) image, the image fusion algorithm may combine the two images to produce one image with 8 megapixel (3264×2448 pixels) resolution. In terms of effective resolution, assuming that an imaged object or scene includes spatial frequencies, the use of a dual-aperture camera having a clear sensor and a color sensor as disclosed herein leads to an overall increase in effective resolution because of the ability of the clear sensor to resolve higher spatial frequencies of the luminance component of the scene, compared with a color sensor. The fusion of the color and clear images as performed in a method disclosed herein (see below) adds information in spatial frequencies which are higher than what could be captured by a color (e.g. Bayer) sub-camera.

In order to generate a higher-resolution or higher effective resolution image, the image fusion algorithm combines the color information from sub-camera 1 with the luminance information from sub-camera 2. Since clear sensor 2 samples the scene at a higher effective spatial sampling rate compared with any color channel or luminance thereof in the color sensor 1, the algorithm synthesizes an image that includes information at higher spatial frequencies compared with the output image from sub-camera 1 alone. The target of the algorithm is to achieve a spatial resolution similar to that obtained from a single-aperture camera with a sensor that has a higher number of pixels. Continuing the example above, the algorithm may combine two 5 megapixel images, one color and one luminance, to produce one 8 megapixel image with information content similar to that of a single-aperture 8 megapixel color camera.

In addition to improved spatial resolution, the image fusion algorithm uses the luminance information from clear sensor 2 to generate an image with increased SNR, vs. an image from a corresponding single-aperture camera. The fact that the pixels of sensor 2 are not covered by color filters allow each pixel to absorb light in a wider wavelength spectrum, resulting in a significant increase in the light efficiency compared with a color CFA camera. In an embodiment, the fusion of clear image information and color image information then provides a +3 dB SNR increase over that of a single aperture digital camera.

As clear sensor 2 is more sensitive than color sensor 1, there may be a need to adjust exposure times or analog gains to match the digital signal levels between the two cameras. This could be achieved by fixing the same exposure times to both sensors and configuring a different analog gain to each sensor, or by fixing the analog gain in both sensors and configuring a different exposure time to each sensor.

Figure 4A:
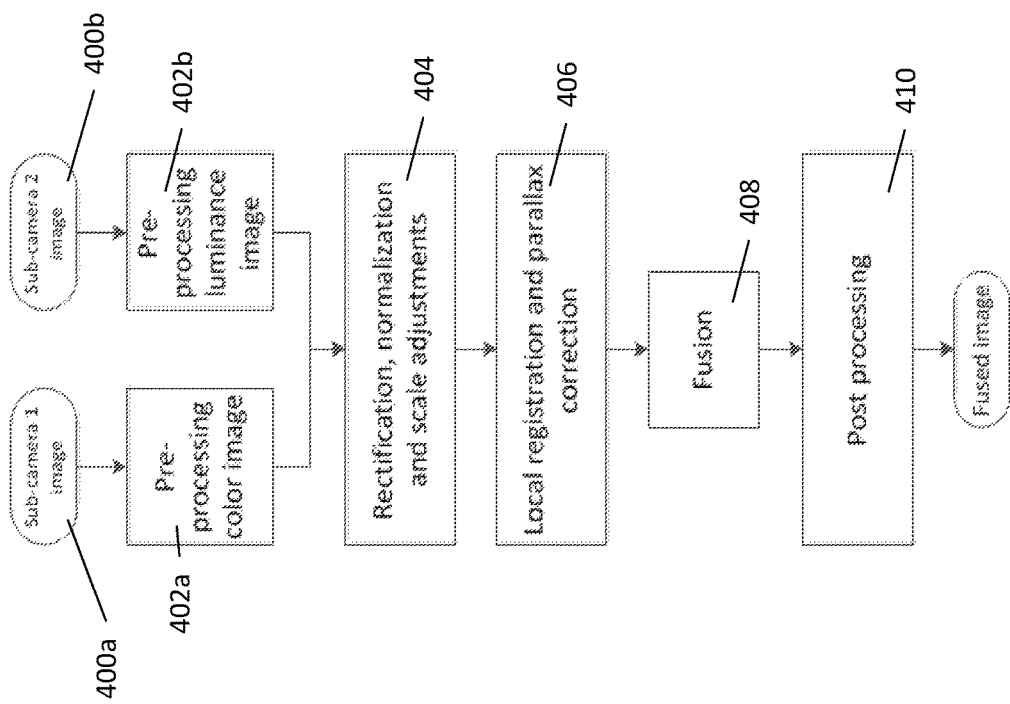
FIG. 4A shows schematically in a flow chart an embodiment of a method disclosed herein.
Figure 4B:
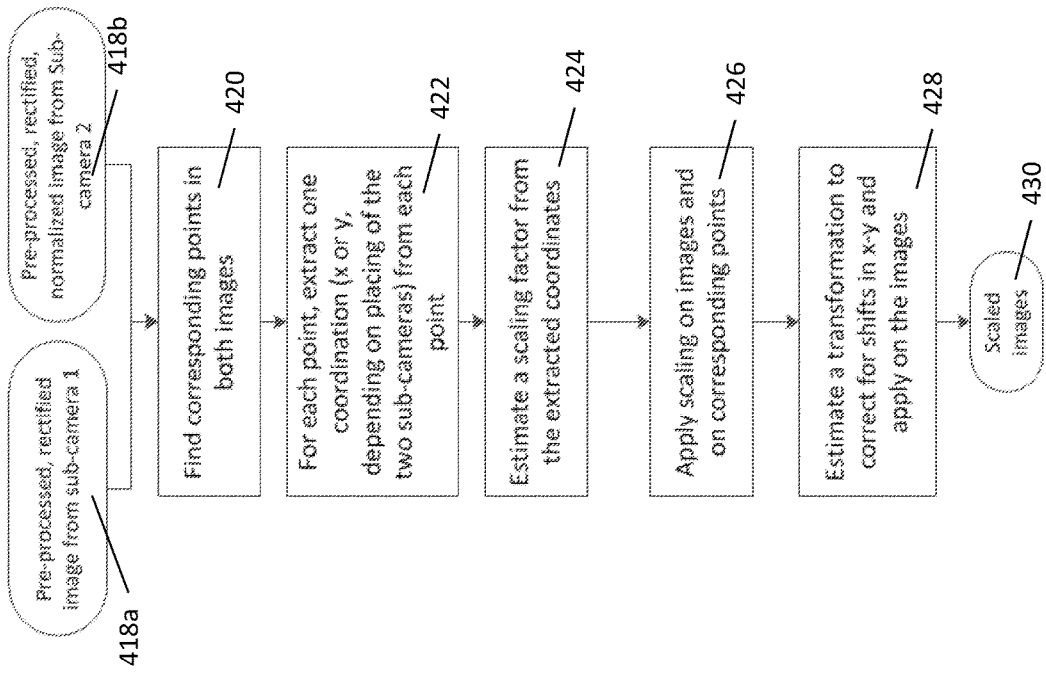
FIG. 4B shows in a flow chart details of the scale adjustment step in the method shown in FIG. 4A.

FIG. 4A shows schematically, in a flow chart, an embodiment of a method disclosed herein. FIG. 4B shows in a flow chart details of the scale adjustment step in the method shown in FIG. 4A. Two images 400a and 400b from respectively sub-cameras 1 and 2 serve as inputs. The two images undergo pre-processing, in respectively step 402a for the color image of sensor 1 and 402b for the luminance image of sensor 2. Step 402a includes digital image signal processing (ISP) in an ISP pipeline. The ISP generates a full color image, with R, G, B values at each image pixel. If the CFA pattern on sensor 1 is non-Bayer, the ISP includes non-standard demosaicing to interpolate the missing colors at each pixel location. In addition to demosaicing, other standard ISP pipeline algorithms may be applied on the image, e.g., black level correction, defect pixel correction, noise removal, etc, as known in the art. The luminance image from sub-camera 2 is also pre-processed to correct for defects, noise, shading profile, blur and other optical, analog and digital aberrations. Normalization, rectification and scale adjustment are then applied on the two images in step 404. First, the two images are normalized to have the same mean signal intensity and standard deviation (which is a measure for the image dynamic range). This is done by subtracting the mean from each pixel and dividing each pixel by the standard deviation in each image. Then, the images are rectified by applying two projection matrices, in order to correct for different rotations around the x, y and z axes, to correct for x-y translations of the optical center of the two cameras and to fix lens distortions. The projection matrices parameters are pre-calculated from calibration data, which may be acquired through a calibration step that is applied for each camera module during camera module assembly. The data may be saved in one-time programmable memory or EEPROM in the camera module. After the rectification step, epipolar lines in both images are more-or-less parallel to the horizontal axis of the image, in case the two sub-cameras are positioned one beside the other along the X-axis, or parallel to the vertical axis of the image, in case the two sub-cameras are positioned one beside the other along the Y axis.

Figure 4C:
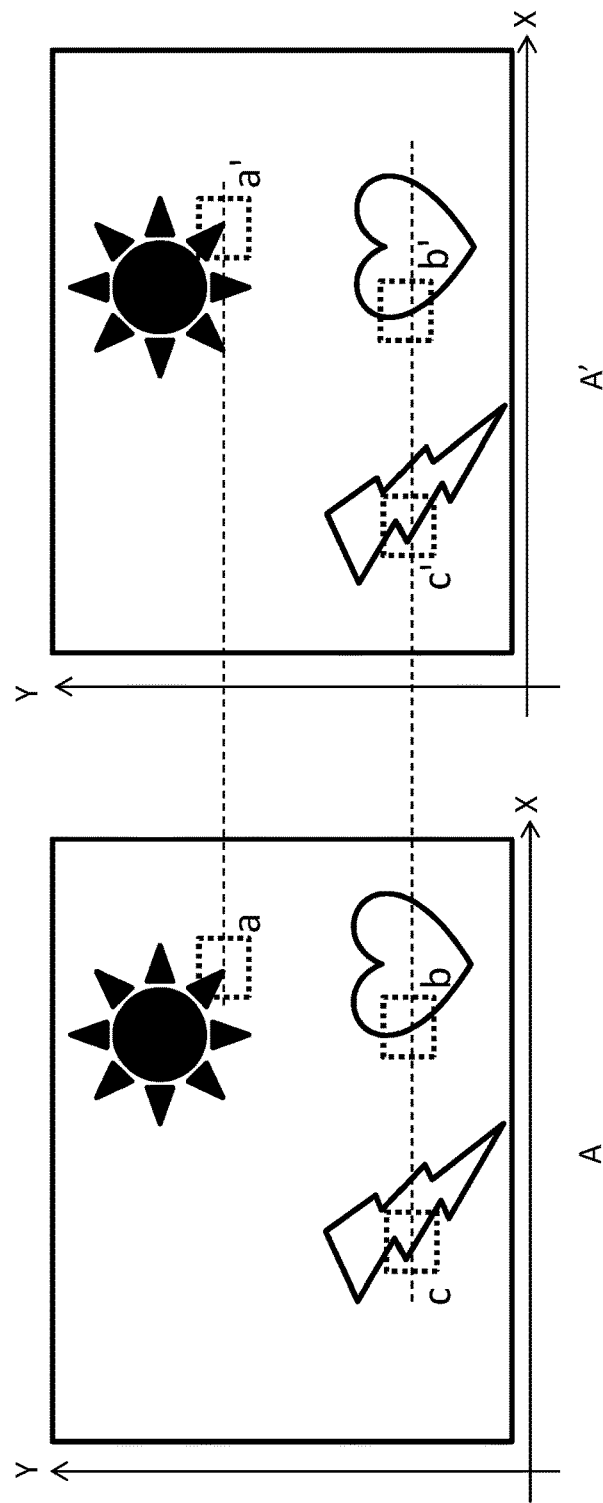
FIG. 4C shows two images with corresponding points.

The scale adjustment, done after the rectification step, is described now in more detail with reference to FIG. 4B. Preprocessed and rectified images 418a and 418b (also shown exemplarily in FIG. 4C) from respectively sub-cameras 1 and 2 serve as inputs. In step 420, corresponding points between the two images are found. In an embodiment, the set of corresponding points is calculated over the entire image. In another embodiment, the set of corresponding points is found for a specific region of interest (ROI) in each image. FIG. 4C, which shows schematically two images A and B of the same scene captured by adjacent cameras (i.e. A captured by sub-camera 1 and A' captured by sub-camera 2) with some parallax—due to the different viewpoint, objects are imaged with some displacement in one image compared with the other, depending on their distance from the cameras. Pairs of features a-a', b-b' and c-c' represent the same "corresponding points" in the two images A and A'. An algorithm is used to find corresponding points between the two images. A set of prominent points are found (e.g. corners) in the two images and then the algorithm finds matches between the points in the two images. Such algorithms are known to the skilled in the art. In step 422, the Y coordinate only is extracted in order to estimate the scale between the two images. Since the position of the optics, which is controlled by the AF mechanism, may introduce different scales between the two sub-camera images, the proper scale needs to be determined for each captured image (i.e. for each focus position). Assuming the two sub-cameras are positioned adjacent to one another along the X-axis, once corresponding pairs of points are found, a single coordinate is extracted from each point in step 422. That is, the algorithm considers only their Y coordinate and disregards their X coordinate. The inventors have advantageously realized that while the X coordinate may be affected by parallax, the Y coordinate is largely unaffected by parallax after the rectification step, and therefore the Y coordinates can be used to estimate the scale more robustly. If the two sub-cameras are positioned adjacent along the Y-axis, then once corresponding pairs of point are found, the algorithm considers only their X coordinate and disregards their Y coordinate. Continuing with the assumption of the two sub-cameras being adjacent along the X-axis, the Y coordinates of the corresponding points are used to estimate a scaling factor S between the images in step 424. In an exemplary embodiment, the scaling factor estimation is performed using least-squares, in which case S is given by $$S=(Y2'^{*}W^{*}Y2)\backslash Y2'^{*}W^{*}Y1$$

where Y1 is a vector of Y coordinates of points taken from one image, Y2 is a vector of Y coordinates of points taken from the other image, and W is a diagonal matrix that holds the absolute values of Y2. Scaling factor S is then used in step 426 to scale one image in order to match the scale between the two images. In step 426, point coordinates in each image are multiplied by the same scaling factor S. Finally, in step 428, the corresponding pairs of scaled points are used to calculate a shift in x and y axes between the two images for each axis. In an embodiment, only a subset of the corresponding points that lie in a certain ROI is used to calculate the shift in x and y. For example, the ROI may be the region used to determine the focus, and may be chosen by the user or the camera software (SW). The estimated shift is applied on one of the images or on both images. The result of the scale adjustment process in FIG. 4B (and in step 404, FIG. 4A) are scaled images 430.

Returning now to FIG. 4A, local registration and parallax correction to estimate a disparity map are applied to the scaled images in step 406. The local registration uses scale and shift parameters found in step 404. Fusion to enhance the resolution and improve SNR in the final image is then performed in step 408, by combining information from both images, according to the disparity map. The fusion process uses the image from sub-camera 1 as a baseline. The output is a fused image 410. Post-processing such as tone mapping, gamma correction, contrast enhancement and color correction/enhancement may then be applied to the fused image.

Auto-Focus

Figure 5A:
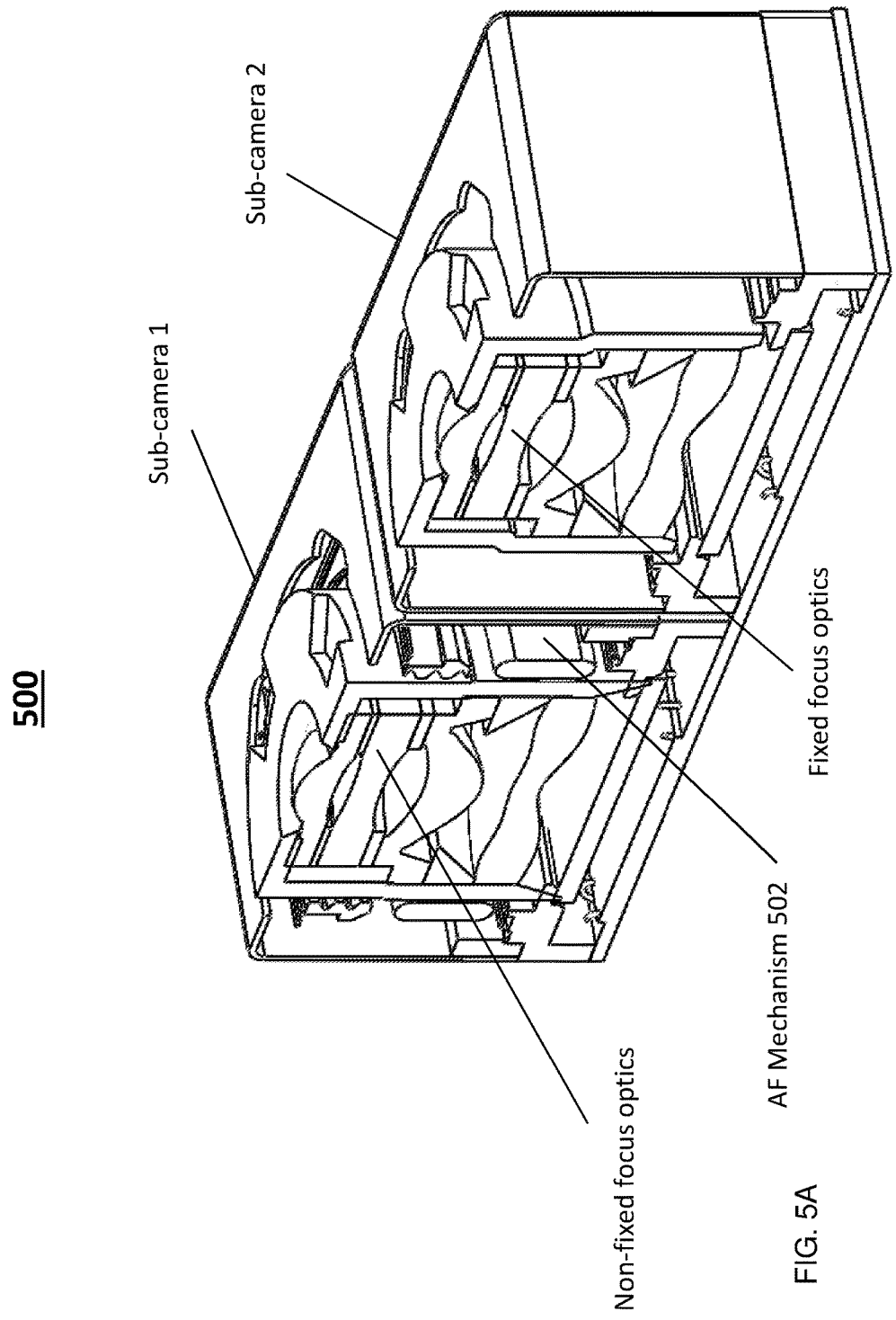
FIG. 5A shows schematically another embodiment of a dual-aperture imaging system with a single auto-focus mechanism disclosed herein in a sectioned isometric view.

As mentioned with respect to FIG. 2, a camera system disclosed herein includes an AF mechanism that controls the focus position of the optics. The system shown in FIG. 2 includes two such AF mechanisms. FIG. 5A shows schematically another embodiment of a dual-aperture imaging system numbered 500 with a single auto-focus mechanism in a sectioned isometric view. System 500 includes in addition to the regular image sensors and optics only one AF mechanism 502, positioned in a color sub-camera 1. A luminance sub-camera 2 does not have an AF mechanism, being instead a fixed-focus camera, with the focus fixed to a certain object distance. The focus position is such that the DOF range of sub-camera 2 is between infinity and several tens of centimeters, depending on the focal length and optical design. For example, the DOF may be between infinity and 50 cm, such that sub-camera 2 would produce sharp images for object distances that lie within this range from the camera. In system 500, sub-camera 1 can produce an image in which the main object is in focus for a wide range of object distances, so that it appears sharp in a sub-camera 1 image, by changing the focus position of the optics.

Figure 5B:
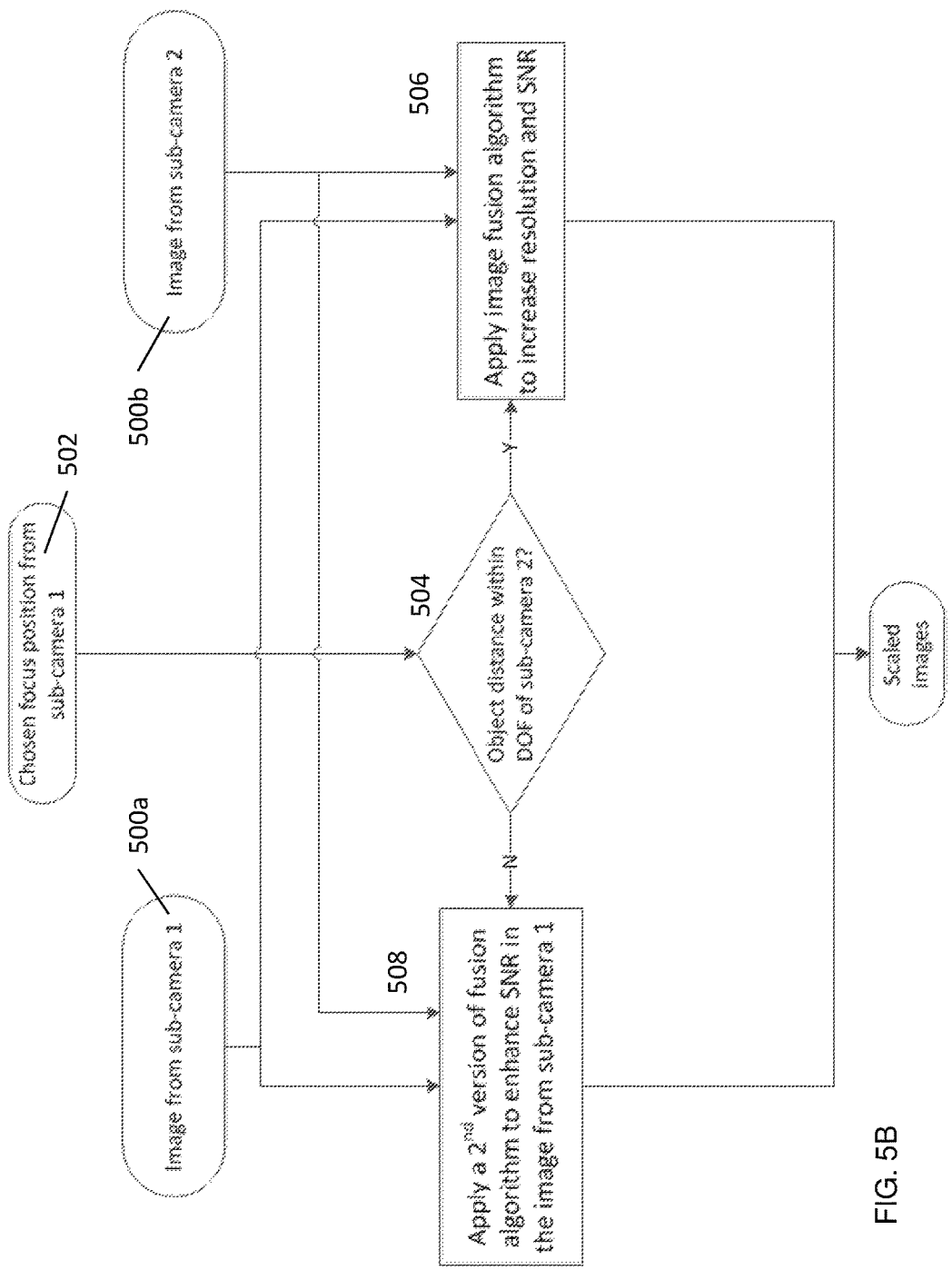
FIG. 5B shows schematically in a flow chart an embodiment of a method for auto-focus imaging with the imaging system in FIG. 5A.

FIG. 5B shows schematically in a flow chart an embodiment of a method for image fusion using an imaging system 500 that has AF. Two images 500a and 500b from respectively sub-cameras 1 and 2 serve as inputs. A focus position is chosen for sub-camera 1 in step 502. A check is performed in step 504 to determine whether the distance of an imaged object lies within the DOF of sub-camera 2, by calculating a sharpness metric on the images of sub-cameras 1 and 2, as known in the art. The calculation of the sharpness metric may result in a sharpness difference. If the answer in the check of step 504 is "Yes", the object will appear sharp in the sub-camera 2 image. In such a case, image fusion as described above is applied to the object image obtained by both sub-cameras in step 506 to achieve higher output resolution and better SNR. If the answer to check 504 is "No" (i.e. the object lies closer to the camera, outside the DOF range of sub-camera 2), the object will appear blurry (not sharp) in the sub-camera 2 image. In this case, the image from sub-camera 2 is not used to enhance the resolution, but only to improve the SNR of the image from sub-camera 1. To this end, another algorithm (procedure) similar to the fusion algorithm (procedure) above is applied in step 508. The image from sub-camera 1 is scaled to the proper output size and a de-noising algorithm that uses information from the sub-camera 2 image is applied. Since in this case high frequencies are lost in the sub-camera 2 image (due to defocus), the algorithm only considers information at low spatial frequencies from the image of sub-camera 2. In order to determine the object distance, the chosen focus position of the AF mechanism of sub-camera 1 is used (after the focusing process has converged).

Figure 6:
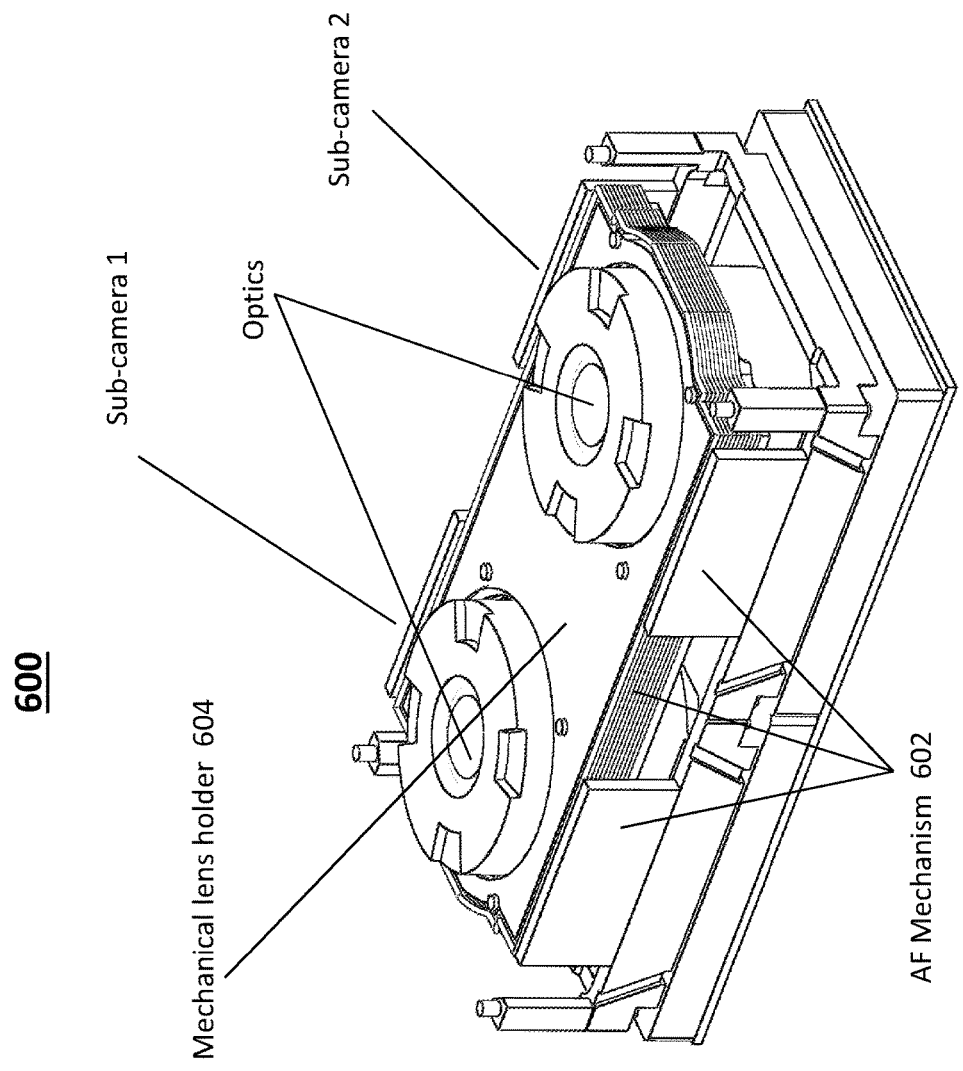
FIG. 6 shows schematically yet another embodiment of a dual-aperture imaging system numbered with a single auto-focus mechanism in a sectioned isometric view.

FIG. 6 shows schematically yet another embodiment of a dual-aperture imaging system numbered 600 with a single AF mechanism in a sectioned isometric view. Similar to system 500, system 600 includes in addition to the regular image sensors and optics only one AF mechanism 602. However, in contrast with AF mechanism 502, AF mechanism 602 moves the optics of sub-camera 1 and the optics of sub-camera 2 together. The optical elements are mounted on a lens holder 604 with dedicated threads to hold the two lenses, which is moved by the AF mechanism. Since the optics of sub-camera 1 and sub-camera 2 have very similar focal lengths, the mechanical movement brings the image from sub-camera 1 and from sub-camera 2 to focus at the same time. The advantage of this construction over having only one AF mechanism is that both sub-cameras support the same range of object distances, so that the image fusion algorithm can be applied for the entire range. When the AF mechanism chooses the best focus position for the lens, information from both sub-camera images can be taken into account (e.g. to assist in focusing in low-light situations). In low-light, AF sharpness measurements are noisier, due to the lower SNR in the images. Using two images instead of one can help reduce the noise and improve the robustness and accuracy of the AF process (algorithm).

In an embodiment, some or all the optical elements of sub-camera 1 and sub-camera 2, are made on the same die, using wafer-level optics manufacturing techniques or injection molding of glass or plastic materials. In this case, the single AF mechanism moves the optical dies on which the optical elements of the two sub-cameras are fabricated, so that the two optical stacks move together.

In another embodiment, a camera is similar to camera 500 and includes a single AF mechanism placed on sub-camera 1 (with the color CFA). Sub-camera 2 does not have an AF mechanism, but uses instead fixed focus optics with unique characteristics that provide extended depth of focus, which is achieved by means of optical design (e.g., by employing optics with narrower aperture and higher F-number). The optical performance of the optics of sub-camera 2 is designed to support sharp images for object distances between infinity and several cm from the camera—in this case, the fusion algorithm can be applied to enhance output resolution for a wider range of object distances compared with the single AF embodiment described above. There is usually a tradeoff between the DOF of the camera and the minimal achievable PSF size across the DOF range. An algorithm may be used to enhance the sharpness of the image captured by sub-camera 2 before the fusion algorithm is applied to combine the photos. Such an algorithm is known in the art.

To conclude, dual-aperture cameras and methods of use of such cameras disclosed herein have a number of advantages over single aperture cameras, in terms of camera height resolution, effective resolution and SNR. In terms of camera height, in one example, a standard 8 Mpix ⅓" camera with a 70 degree diagonal FOV may have a module height of 5.7 mm. In comparison, a dual-aperture camera disclosed herein, with two 5 Mpix ¼" image sensors (one color and one clear), each with 70 degrees diagonal field of view may have a module height of 4.5 mm. In another example, a standard 8 Mpix ⅓" camera with a 76 degree diagonal FOV may have a module height of 5.2 mm. In comparison, a dual-aperture camera disclosed herein, with two 5 Mpix ¼" image sensors (one color and one clear), each with a 76 degree diagonal FOV, may have a module height of 4.1 mm.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A dual-aperture digital camera, comprising:
    a) a first sub-camera that includes a first optics bloc with a respective first optical axis and a first, color image sensor covered with a color filter array (CFA) with a first number of pixels and a first pixel size, the first camera configured to output a first image;
    b) a second sub-camera that includes a second optics bloc with a respective second optical axis and a second, clear image sensor with a second number of pixels and a second pixel size, the second camera configured to output a second image, wherein the first and second optics blocs are mounted on a single lens holder;
    c) a single autofocus (AF) mechanism coupled mechanically to the single lens holder and operative to move the single lens holder and the first and second optics blocs mounted thereon together for AF in a direction common to the respective first and second optical axes;
    d) an optical image stabilization (OIS) mechanism, coupled mechanically to the first and second optics blocs and operative to move the first and second optics blocs together for OIS in a direction perpendicular to the first and second optical axes; and
    e) an image fusion algorithm that combines the first image and the second image into a combined color image.

2. The dual-aperture digital camera of claim 1, wherein the first number of pixels and the second numbers of pixels are the same.

3. The dual-aperture digital camera of claim 1, wherein the first number of pixels and the second numbers of pixels are different.

4. The dual-aperture digital camera of claim 2, wherein the first pixel size and the second pixel size are the same.

5. The dual-aperture digital camera of claim 1, wherein the two sub-cameras having substantially the same field of view.

6. The dual-aperture digital camera of claim 3, wherein the two sub-cameras having substantially the same field of view.

7. The dual-aperture digital camera of claim 4, wherein the two sub-cameras having substantially the same field of view.

* * * * *